United States Patent

Toth

[11] Patent Number: 6,138,445
[45] Date of Patent: Oct. 31, 2000

[54] MOWER HITCH SYSTEM

[75] Inventor: Delmar Toth, Humboldt, Canada

[73] Assignee: Schulte Industries Ltd., Englefeld, Canada

[21] Appl. No.: 09/158,058

[22] Filed: Sep. 22, 1998

[51] Int. Cl.[7] .................................................. A01D 34/00
[52] U.S. Cl. ...................... 56/15.5; 56/14.9; 56/DIG. 14
[58] Field of Search .................. 56/14.9, 15.1, 56/15.2, 15.5, DIG. 14, DIG. 22, DIG. 6, 6; 172/35, 48, 50, 56, 111, 125

[56] References Cited

U.S. PATENT DOCUMENTS

| | | | |
|---|---|---|---|
| 1,557,902 | 10/1925 | Thompson | 56/15.5 |
| 2,225,156 | 12/1940 | Coultas | 56/25 |
| 3,387,436 | 6/1968 | Kasper | 56/6 |
| 3,452,530 | 7/1969 | Kulak | 56/503 |
| 3,657,866 | 4/1972 | Burroughs | 56/15.5 |
| 3,699,752 | 10/1972 | Dandl | 56/13.6 |
| 3,989,272 | 11/1976 | McCanse et al. | |
| 4,195,860 | 4/1980 | Helams | 56/15.5 |
| 5,201,167 | 4/1993 | Rowse | 56/15.5 |

OTHER PUBLICATIONS

Brochure: "BUSH HOG" 3008 Series Rotary Cutters Model 3008SH, date unkown.

*Primary Examiner*—Thomas B. Will
*Assistant Examiner*—Nathan Mammen
*Attorney, Agent, or Firm*—Murray E. Thrift; Adrian D. Battison

[57] ABSTRACT

A mower with a hitch system allows large lateral offsets in both directions of the mower relative to a towing vehicle. The mower hitch system includes first and second swing arms spaced apart across the mower. First and second pivot shafts mount the respective first and second swing arms on the mower for pivotal movement of the arms about respective upright axes spaced apart across the mower. The swing arms extend towards a front end of the mower for connecting to lift arms of a three point hitch on the towing vehicle. A lug extends from the first pivot shaft such that the first swing arm and the lug form a bell crank. A hydraulic cylinder mounted on the front end of the mower connects to the lug such that extension and contraction of the cylinder pivots the first swing arm laterally over the cylinder and across the mower. The towing vehicle also includes a power take off for connecting to a telescoping drive shaft assembly with universal joints on the mower. The mower includes a primary gearbox with an input connected to the drive shaft assembly and two secondary drive shafts positioned on opposite lateral sides of the primary gearbox for driving respective mower blades. Two secondary drive shafts connect the primary gearbox to the respective secondary gearboxes. The primary gearbox is mounted rearwards of the secondary gearboxes.

5 Claims, 2 Drawing Sheets

MOWER HITCH SYSTEM

FIELD OF THE INVENTION

This invention relates to mowers, and more particularly to mowers having a swing hitch for offsetting the mower laterally relative to a towing vehicle.

BACKGROUND

Rotary mowers are designed for a wide range of mowing applications. In some mowers, a swing hitch is used for offsetting the mower to one side of a towing vehicle in order for the mower to reach under trees and shrubs.

A known design for this type of machine is in the form of dual rotary blades rotating side by side within a housing. A pair of swing arms are mounted on the housing for connection to a three point hitch. The offset of the mower is controlled by a hydraulic cylinder mounted on the housing and connected to one of the swing arms. Power is delivered to the mower from a tractor power take off shaft connected to a primary gearbox. Secondary gearboxes receive torque from the primary gearbox and drive the respective mower blades.

There are some disadvantages to this design. The hydraulic cylinder for controlling the swing arms extends to one side of the swing arm, so that the arm is only able to swing in one direction. This limits the mower to an offset to one side only of the tractor. Limitations are imposed on the amount of offset to avoid exceeding the recommended offset angle of the drive shaft assembly.

SUMMARY

According to a first aspect of the invention there is provided a rotary mower to be towed by a vehicle having a hitch with a pair of laterally spaced hitch arms, the mower comprising;
   first and second swing arms, the swing arms being laterally spaced apart and having leading ends for connection to the respective hitch arms;
   first and second pivot shafts secured to the first and second swing arms respectively;
   pivot mounting means mounting the pivot shafts on the mower for pivotal movement about respective upright axes spaced apart across the mower; and
   swing drive means mounted on the mower and connected to the first pivot shaft for rotating the first pivot shaft and thereby pivoting the first swing arm laterally across the mower.

With the swing arms mounted on pivot shafts, the arms can be positioned clear of any obstructions on the mower deck, including the swing drive. This allows a greater range of swing movement, including the ability to offset to both sides.

The swing drive means preferably include a lug mounted on and extending from the first pivot shaft such that the first swing arm and the lug form a bell crank. An hydraulic cylinder is mounted on the mower and connected to the lug such that extension and contraction of the cylinder pivots the first pivot shaft and swings the first swing arm laterally across the mower. The pivot connections of the second swing arm to the mower and the tractor hitch cause it to follow the swing of the first arm.

Preferably the cylinder is mounted on a front end of the mower and the first swing arm is secured to the first pivot shaft above the lug such that the first swing arm is free to pivot over the cylinder. With the cylinder mounted on the front end of the mower, the cylinder provides less of an obstruction to such things as branches or fruit in orchards which pass over the mower while the mower is in use.

According to a further aspect of the invention there is provided a mower for connection to a towing vehicle having a power take off, the mower comprising:
   a swing hitch for connecting the mower to the towing vehicle and including means for offsetting the mower laterally with respect to the towing vehicle;
   a drive shaft assembly having a variable length and including universal joints for connection to the power take off to transmit torque from the power take off to the mower;
   a primary gearbox with an input connected to the drive shaft;
   two secondary gearboxes positioned on opposite lateral sides of the primary gearbox for driving respective mower rotors; and
   two secondary drive shafts connecting the primary gearbox to the respective secondary gearboxes, wherein:
   the primary gearbox is mounted rearwards of the secondary gearboxes.

The primary gearbox mounted rearwards of the secondary gearbox lengthens the drive shaft and reduces the offset angle of the drive shaft from the power take off when the mower is offset laterally. This allows a greater lateral offset of the mower without exceeding the recommended operating angle of the drive shaft.

BRIEF DESCRIPTION OF THE DRAWINGS

In the accompanying drawings, which illustrate an exemplary embodiment of the present invention.

DETAILED DESCRIPTION

Figure 1:
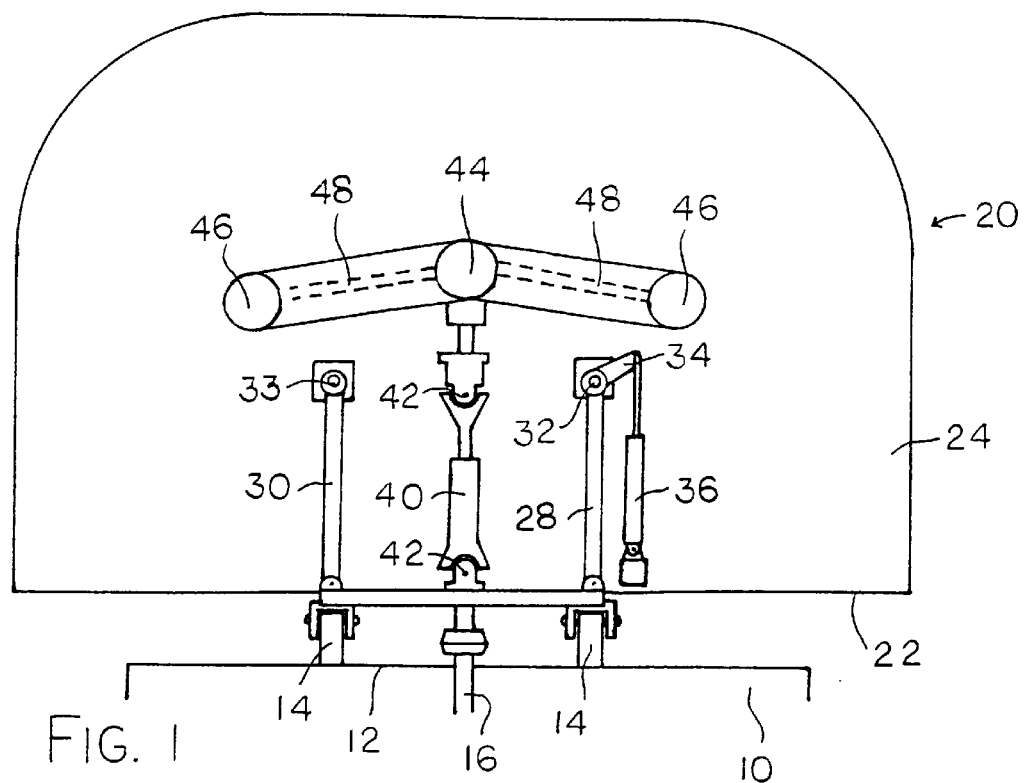
FIG. 1 is a top plan view of the mower hitch system connected to a three point hitch when the mower and hitch are aligned.
Figure 2:
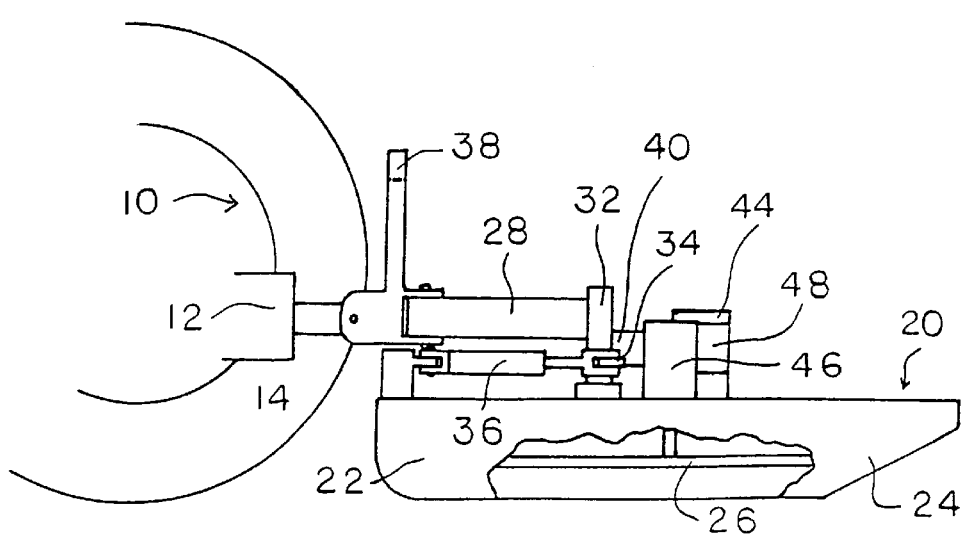
FIG. 2 is a side elevation view of the mower hitch system connected to a three point hitch.

Referring to the accompanying drawings, there is illustrated a mower 20 having a hitch system for connecting to towing vehicle 10. The vehicle 10 has a three point hitch 12 including a pair of laterally spaced lift arms 14. The vehicle 10 also has a power take off 16. The mower 20, having a front end 22, includes a housing 24 and two rotating cutters 26 rotatable therein.

The mower hitch system includes a first swing arm 28 and a second swing arm 30. A first pivot shaft 32 and a second pivot shaft 33 mount the respective first and second swing arms on the mower for pivotal movement of the swing arms 28 and 30 about respective upright axes spaced apart across the mower 20. The swing arms 28 and 30 extend towards the front end 22 of the mower for connecting to the respective hitch lift arms 14.

A lug 34 extends from the first pivot shaft 32 of the first swing arm 28 such that the first swing arm and the lug form a bell crank. A hydraulic cylinder 36 mounted to the front end 22 of the mower 20, connects to the lug 34. The arrangement of the cylinder 36 mounted on the front end 22 provides less of an obstruction to such things as branches and fruit passing over the mower when using the mower in an orchard for example.

Extension and contraction of the cylinder 36 pivots the first swing arm 28 laterally across the mower 20. The cylinder 36 is mounted below the first swing arm 28 such that the first swing arm 28 is free to pivot over the cylinder 36.

Figure 3:
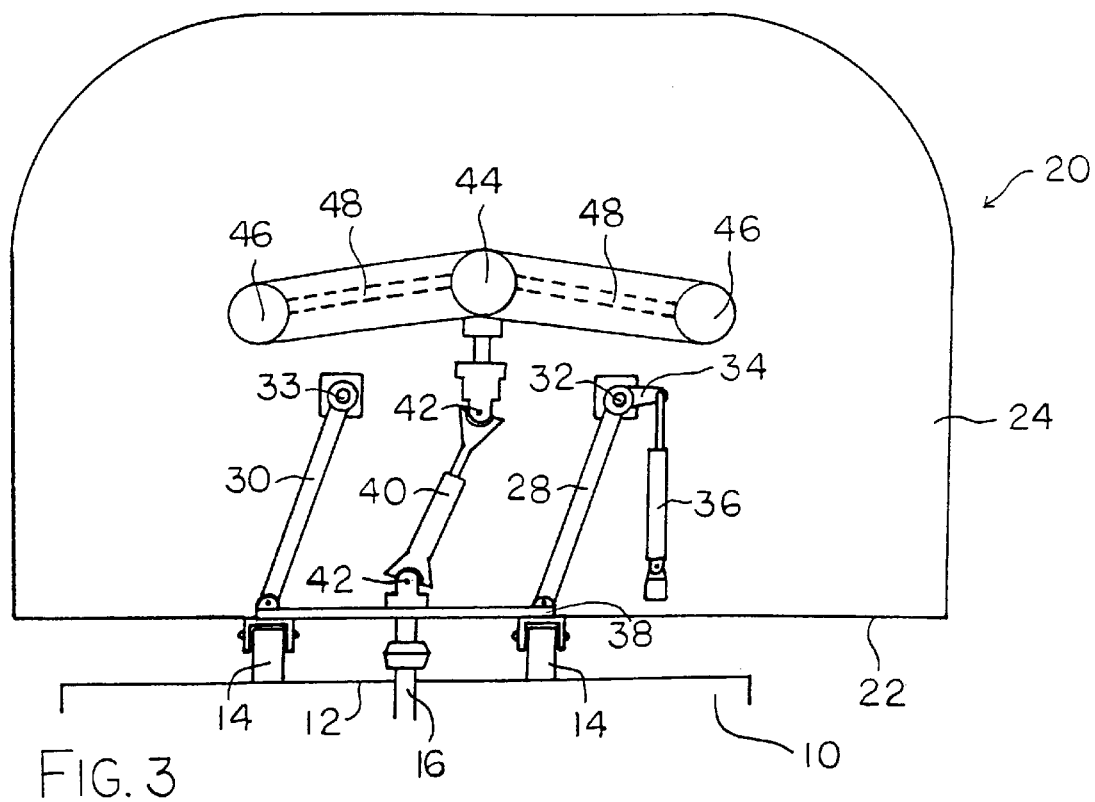
FIG. 3 is a top plan view of the mower hitch system connected to a three point hitch when the mower is offset to one side of the hitch.
Figure 4:
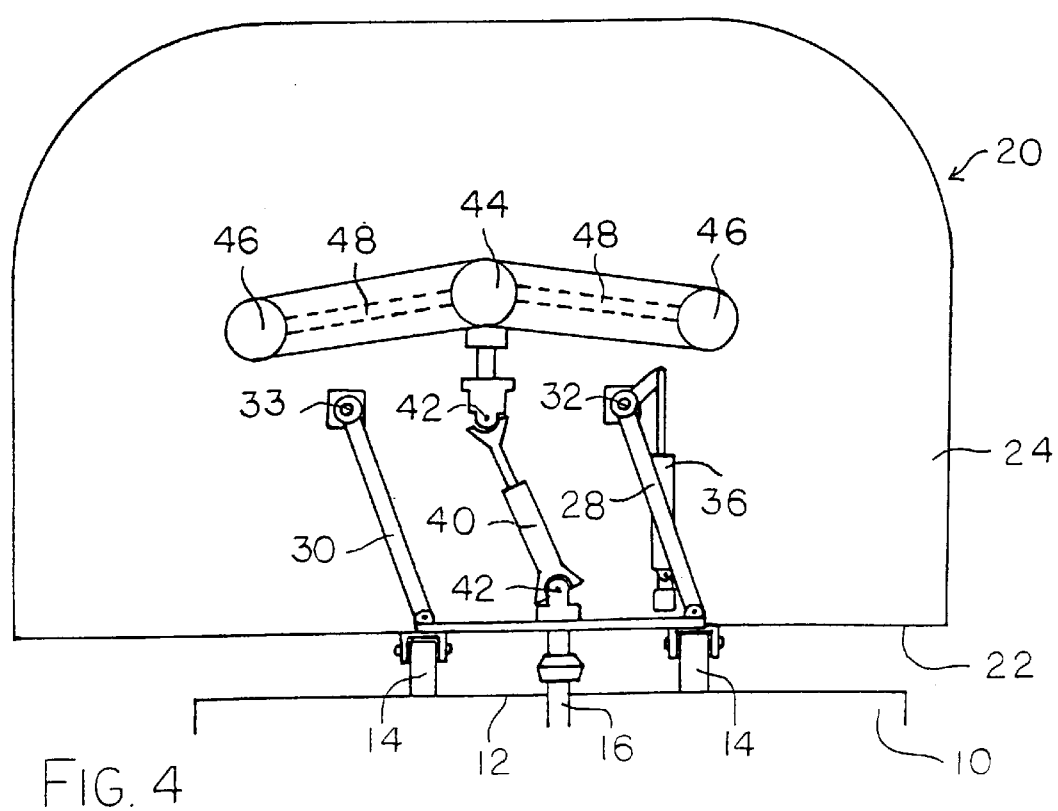
FIG. 4 is a view like FIG. 3 with the mower offset to the opposite side.

A cross link 38 connects the ends of the swing arms 28 and 30 connected to the hitch lift arms 14. As the cylinder 36 pivots the first swing arm 28, the second swing arm 30 follows a corresponding arc. The mower is capable of being offset laterally in either direction due to the arrangement of the cylinder 36. FIGS. 3 and 4 show the mower 20 in the offset positions.

The mower 20 receives power from the power take off 16 using a telescoping drive shaft assembly 40. The drive shaft 40 includes universal joints 42 and transmits torque to the mower 20. The drive shaft 40 is connected to an input of a primary gearbox 44. A pair of secondary gearboxes 46 are positioned on opposite lateral sides of the primary gearbox 44 for driving the respective mower blades 26. Two secondary drive shafts 48 connect the primary gearbox 44 to the respective secondary gearboxes 46.

The primary gearbox 44 is mounted to the rear of the secondary gearboxes 46 in order to lengthen the drive shaft 40. The longer drive shaft 40 will allow a greater lateral offset of the mower 20 without exceeding the recommended operating angle of the drive shaft 40.

While one embodiment of the present invention has been described in the foregoing, it is to be understood that other embodiments are possible within the scope of the invention. The invention is to be considered limited solely by the scope of the appended claims.

What is claimed is:

1. A rotary mower to be towed by a vehicle having a hitch with a pair of laterally spaced hitch arms, the mower comprising;

a housing;

first and second swing arms spaced above the housing, the swing arms being laterally spaced apart and having respective leading ends extending forward to a front end of the housing for connection to the respective hitch arms;

first and second pivot shafts secured to the first and second swing arms respectively;

pivot mounting means mounting the pivot shafts on the mower for pivotal movement about respective upright axes spaced apart across the mower;

a crank element connected to the first pivot shaft to extend laterally outward therefrom to a free end offset vertically below the first swing arm; and a hydraulic cylinder mounted vertically spaced between the housing and the swing arms, the cylinder having a forward end coupled to the housing and a rearward end coupled to the free end of the crank element;

whereby extension and contraction of the cylinder pivots the first swing arm laterally across the cylinder between respective first and second offset positions on opposing sides of the cylinder.

2. A mower according to claim 1 wherein the crank element comprises a lug mounted on the first pivot shaft mounting the hydraulic cylinder thereon at a position spaced from the pivot shaft and connecting the hydraulic cylinder to the first swing arm defining a bell crank arrangement.

3. A mower according to claim 1 wherein the forward end of the cylinder is mounted on the front end of the housing to extend rearward therefrom.

4. The mower according to claim 2 wherein the first swing arm is secured to the first pivot shaft above the lug such that the first swing arm is free to pivot over the cylinder.

5. The mower according to claim 1 wherein the towing vehicle includes a power take off and wherein there is provided:

a drive shaft assembly having a variable length and including universal joints for connection to the power take off to transmit torque from the power take off to the mower;

a primary gearbox with an input connected to the drive shaft;

two secondary gearboxes positioned on opposite lateral sides of the primary gearbox for driving respective mower rotors; and two secondary drive shafts connecting the primary gearbox to the respective secondary gearboxes, wherein the primary gearbox is spaced farther from the front end of the mower than the secondary gearboxes.

* * * * *